(12) United States Patent
Kohigashi et al.

(10) Patent No.: US 10,118,462 B2
(45) Date of Patent: Nov. 6, 2018

(54) HEAT-PUMP-TYPE VEHICULAR AIR-CONDITIONING SYSTEM

(71) Applicant: MITSUBISHI HEAVY INDUSTRIES THERMAL SYSTEMS, LTD., Minato-ku, Tokyo (JP)

(72) Inventors: Hirotsugu Kohigashi, Aichi (JP); Nobuya Nakagawa, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 368 days.

(21) Appl. No.: 14/780,830

(22) PCT Filed: Jun. 6, 2014

(86) PCT No.: PCT/JP2014/065078
§ 371 (c)(1),
(2) Date: Sep. 28, 2015

(87) PCT Pub. No.: WO2014/199916
PCT Pub. Date: Dec. 18, 2014

(65) Prior Publication Data
US 2016/0052365 A1    Feb. 25, 2016

(30) Foreign Application Priority Data

Jun. 14, 2013   (JP) .................................. 2013-125472

(51) Int. Cl.
*B60H 1/00*   (2006.01)
*B60H 1/22*   (2006.01)
(Continued)

(52) U.S. Cl.
CPC ........... *B60H 1/22* (2013.01); *B60H 1/00899* (2013.01); *B60H 1/00921* (2013.01);
(Continued)

(58) Field of Classification Search
CPC .. B60H 1/22; B60H 1/00899; B60H 1/00921; B60H 2001/00928; F25B 13/00;
(Continued)

(56) References Cited

U.S. PATENT DOCUMENTS 2,212,503 A * 8/1940 Nickell ............. B60H 1/00007
165/202
3,100,384 A * 8/1963 Lowensohn .......... F25D 19/003
165/202
(Continued)

FOREIGN PATENT DOCUMENTS

CN       102889653 A    1/2013
CN       102958724 A    3/2013
(Continued)

OTHER PUBLICATIONS

German Office Action, dated Feb. 9, 2017, for German Application No. 112014002805.3, as well as an English translation.
(Continued)

*Primary Examiner* — Claire Rojohn, III
(74) *Attorney, Agent, or Firm* — Birch, Stewart, Kolasch & Birch, LLP

(57) ABSTRACT

A heat-pump-type vehicular air-conditioning that includes a cooling refrigerant circuit. The circuit has a base for connecting an onboard condenser provided on the downstream side of an onboard evaporator inside an HVAC unit. The circuit includes a second decompression unit between the outlet side of a receiver and one end side of a vehicle-mounted external heat exchanger. Also included is a second circuit having a solenoid valve opened during heating between the other end side of the vehicle-mounted external heat exchanger and the intake circuit of an electric compressor. The vehicular air-conditioning system being provided with a heating refrigerant circuit in which the electric compressor, a switching unit, the onboard condenser, the
(Continued)

receiver, the first circuit, the vehicle-mounted external heat exchanger, and the second circuit are connected in the stated order.

5 Claims, 12 Drawing Sheets

(51) Int. Cl.
 F25B 13/00 (2006.01)
 F25B 41/06 (2006.01)
(52) U.S. Cl.
 CPC ............ *F25B 13/00* (2013.01); *F25B 41/062* (2013.01); *B60H 2001/00928* (2013.01); *F25B 2313/02342* (2013.01); *F25B 2313/02732* (2013.01); *F25B 2313/02791* (2013.01); *F25B 2400/16* (2013.01)
(58) Field of Classification Search
 CPC ............... F25B 41/062; F25B 2400/16; F25B 2313/02791; F25B 2313/02732; F25B 2313/02342
 USPC .......................................................... 165/202
 See application file for complete search history.

(56) References Cited

U.S. PATENT DOCUMENTS

| | | | | | |
|---|---|---|---|---|---|
| 3,191,669 | A | * | 6/1965 | Johnson | B60H 1/00814 165/202 |
| 4,257,239 | A | * | 3/1981 | Partin | F25B 13/00 62/238.7 |
| 4,761,964 | A | * | 8/1988 | Pacheco | F24F 1/022 62/160 |
| 5,299,431 | A | * | 4/1994 | Iritani | B60H 1/00021 62/159 |
| 5,305,613 | A | * | 4/1994 | Hotta | B60H 1/00392 180/65.1 |
| 5,388,421 | A | * | 2/1995 | Matsuoka | B60H 1/00007 62/209 |
| 5,419,149 | A | * | 5/1995 | Hara | B60H 1/00007 62/160 |
| 5,537,831 | A | * | 7/1996 | Isaji | B60H 1/00878 62/160 |
| 5,553,662 | A | * | 9/1996 | Longardner | B60H 1/00492 165/10 |
| 5,598,887 | A | | 2/1997 | Ikeda et al. | |
| 5,605,051 | A | * | 2/1997 | Iritani | B60H 1/3211 62/160 |
| 5,634,348 | A | * | 6/1997 | Ikeda | B60H 1/00735 62/160 |
| 5,685,162 | A | * | 11/1997 | Iritani | B60H 1/00021 62/156 |
| 5,701,753 | A | * | 12/1997 | Iritani | B60H 1/3205 62/211 |
| 5,704,219 | A | * | 1/1998 | Suzuki | B60H 1/00907 237/2 B |
| 5,765,383 | A | * | 6/1998 | Inoue | B60H 1/3205 62/209 |
| 5,778,691 | A | * | 7/1998 | Suzuki | B60H 1/00907 62/160 |
| 5,782,102 | A | * | 7/1998 | Iritani | B60H 1/00021 62/197 |
| 5,934,094 | A | * | 8/1999 | Itoh | B60H 1/3205 62/160 |
| 5,954,120 | A | * | 9/1999 | Aoki | F24V 40/00 165/43 |
| 5,971,290 | A | * | 10/1999 | Echigoya | B60H 1/00485 237/12.3 A |
| 5,971,845 | A | * | 10/1999 | Echigoya | B60H 1/00735 454/121 |
| 5,975,191 | A | * | 11/1999 | Ohashi | B60H 1/00035 165/43 |
| 5,983,989 | A | * | 11/1999 | Kimishima | B60H 1/00735 165/228 |
| 6,005,481 | A | * | 12/1999 | Takagi | B60H 1/2206 165/202 |
| 6,044,655 | A | * | 4/2000 | Ozaki | F25B 9/008 62/205 |
| 6,059,016 | A | * | 5/2000 | Rafalovich | B60H 1/00492 165/10 |
| 6,070,650 | A | * | 6/2000 | Inoue | B60H 1/00428 165/202 |
| 6,073,459 | A | * | 6/2000 | Iritani | B60H 1/3205 62/204 |
| 6,076,593 | A | * | 6/2000 | Takagi | B60H 1/00914 165/201 |
| 6,082,128 | A | * | 7/2000 | Lake | B60H 1/00392 62/324.6 |
| 6,089,034 | A | * | 7/2000 | Lake | B60H 1/00907 62/204 |
| 6,094,930 | A | * | 8/2000 | Zeng | B60H 1/00907 236/92 B |
| 6,105,666 | A | * | 8/2000 | Tajima | B60H 1/00914 165/202 |
| 6,112,807 | A | * | 9/2000 | Dage | B60H 1/3207 165/202 |
| 6,125,643 | A | * | 10/2000 | Noda | B60H 1/00914 165/202 |
| 6,138,466 | A | * | 10/2000 | Lake | B60H 1/00278 429/62 |
| 6,212,892 | B1 | * | 4/2001 | Rafalovich | F25B 5/04 62/90 |
| 6,330,909 | B1 | * | 12/2001 | Takahashi | B60H 1/005 165/202 |
| 6,370,903 | B1 | * | 4/2002 | Wlech | B60H 1/00385 165/104.12 |
| 6,422,308 | B1 | * | 7/2002 | Okawara | B60H 1/00921 165/202 |
| 6,430,951 | B1 | * | 8/2002 | Iritani | B60H 1/00021 62/160 |
| 6,640,889 | B1 | * | 11/2003 | Harte | B60H 1/00885 165/202 |
| 6,672,087 | B1 | * | 1/2004 | Taras | F24F 3/153 62/173 |
| 6,715,540 | B2 | * | 4/2004 | Kobayashi | B60H 1/3207 165/202 |
| 6,834,511 | B2 | * | 12/2004 | Hatakeyama | B60H 1/00849 62/159 |
| 6,862,892 | B1 | * | 3/2005 | Meyer | B60H 1/00878 165/42 |
| 6,928,831 | B2 | * | 8/2005 | Heyl | B60H 1/00907 62/159 |
| 6,986,385 | B1 | * | 1/2006 | Gilles | B60H 1/00328 165/140 |
| 7,062,930 | B2 | * | 6/2006 | Rayburn | F24F 3/153 62/173 |
| 7,080,520 | B2 | * | 7/2006 | Satzger | B60H 1/00885 62/196.4 |
| 7,096,935 | B2 | * | 8/2006 | Ieda | B60H 1/00428 165/202 |
| 7,191,604 | B1 | * | 3/2007 | Wiggs | F24F 3/14 62/324.1 |
| 7,207,379 | B2 | * | 4/2007 | Takano | B60H 1/3208 165/202 |
| 7,461,517 | B2 | * | 12/2008 | Kurosawa | B60H 1/00921 62/324.1 |
| 7,770,405 | B1 | * | 8/2010 | Dillon | F24F 3/153 236/44 C |
| 7,823,404 | B2 | * | 11/2010 | Hanson | F25B 5/04 137/493 |
| 7,903,414 | B2 | * | 3/2011 | Nishiyashiki | G01P 5/12 165/202 |
| 7,921,661 | B2 | * | 4/2011 | Taras | F24F 3/153 417/251 |
| 8,082,751 | B2 | * | 12/2011 | Wiggs | F25B 43/02 62/468 |

(56) References Cited

U.S. PATENT DOCUMENTS

| | | | | |
|---|---|---|---|---|
| 8,109,110 | B2* | 2/2012 | Wiggs | F25B 30/06 62/260 |
| 8,402,780 | B2* | 3/2013 | Wiggs | F25B 13/00 62/192 |
| 8,468,842 | B2* | 6/2013 | Wiggs | F25B 30/06 62/150 |
| 8,776,543 | B2* | 7/2014 | Wiggs | F25B 30/06 62/260 |
| 8,833,098 | B2* | 9/2014 | Wiggs | F25B 30/06 62/260 |
| 8,931,547 | B2* | 1/2015 | Yen | B60H 1/00392 165/202 |
| 8,984,903 | B2* | 3/2015 | Itoh | F24F 3/1405 62/196.1 |
| 9,243,811 | B2* | 1/2016 | Saito | F24F 11/006 |
| 2002/0005268 | A1* | 1/2002 | Noda | B60H 1/00878 165/42 |
| 2003/0159455 | A1* | 8/2003 | Aikawa | B60H 1/005 62/225 |
| 2009/0282854 | A1* | 11/2009 | Matsuoka | F24F 3/001 62/335 |
| 2011/0016896 | A1* | 1/2011 | Oomura | B60H 1/00785 62/155 |
| 2012/0043056 | A1* | 2/2012 | Shimazu | F24F 3/065 165/96 |
| 2013/0019615 | A1* | 1/2013 | Choi | B60H 1/00 62/79 |
| 2013/0081419 | A1* | 4/2013 | Katoh | B60H 1/004 62/278 |
| 2013/0139528 | A1* | 6/2013 | Katayama | B60H 1/00921 62/81 |
| 2015/0033782 | A1* | 2/2015 | Kondo | B60H 1/00921 62/244 |
| 2016/0052365 | A1* | 2/2016 | Kohigashi | B60H 1/00921 165/202 |
| 2017/0274733 | A1* | 9/2017 | Suzuki | B60H 1/00978 |

FOREIGN PATENT DOCUMENTS

| | | |
|---|---|---|
| JP | 9-286225 A | 11/1997 |
| JP | 11-170849 A | 6/1999 |
| JP | 2012-96634 A | 5/2012 |
| JP | 2012-158197 A | 8/2012 |
| JP | 2013-23210 A | 2/2013 |
| JP | 3538845 B2 | 2/2013 |

OTHER PUBLICATIONS

Office Action dated Jun. 30, 2016 in corresponding Chinese Application No. 201480018847.0 with an English Translation.

* cited by examiner

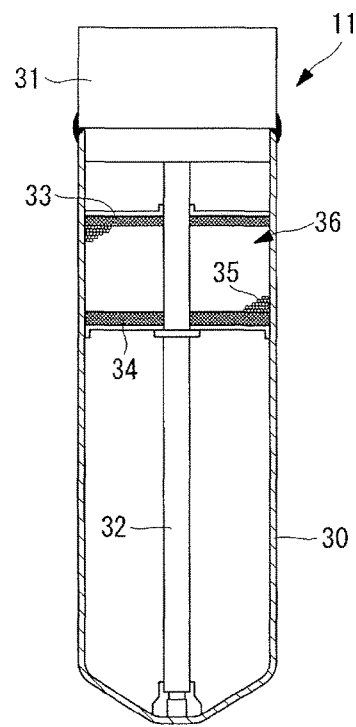
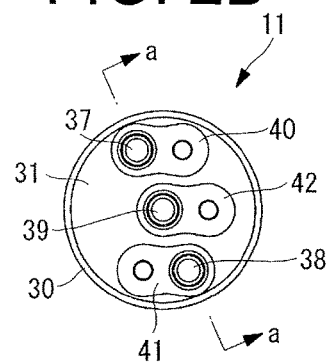
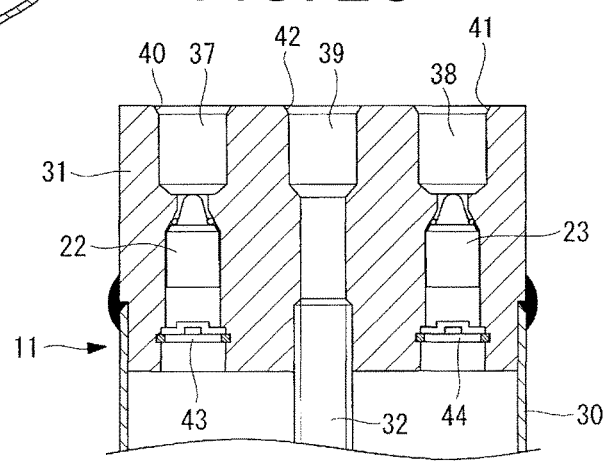

HEAT-PUMP-TYPE VEHICULAR AIR-CONDITIONING SYSTEM

TECHNICAL FIELD

The present invention pertains to a heat-pump-type vehicular air-conditioning system applicable to air conditioning in an electric vehicle (hereinafter, EV) or the like.

BACKGROUND ART

A vehicular air conditioning system used in an EV, a hybrid electric vehicle (HEV), a plug-in hybrid electric vehicle (PHEV), and the like is unable to perform a heating operation using combustion exhaust heat of engine cooling water and the like. As such, a heat-pump-type air-conditioning system using an electric compressor is being considered. However, in a situation involving a reverse-type heat pump, various pipes and heat exchangers such as evaporators, condensers, and the like making up a refrigerant circuit must be able to operate jointly under different pressure conditions for cooling operation and heating operation. Thus, a current vehicular air conditioning system applicable to an engine-driven vehicle must be completely modified.

As such, a heat-pump-type vehicular air-conditioning system configured with a heating refrigerant circuit, where a cooling refrigerant circuit of a current system is used as is, with the addition of an onboard condenser (also termed a subcondenser) provided within a heating ventilation and air conditioning unit (hereinafter, HVAC unit) and of an external evaporator to the circuit via a switching valve, a bypass circuit, and the like, has been provided, for example by Patent Document 1.

Conversely, Patent Document 2 discloses a heat-pump-type vehicular air-conditioning system configured with a heating bypass circuit connected to an external condenser via a four-way valve and connected to a subcondenser on an upstream side of an expansion valve, with an evaporator disposed on a downstream side of the subcondenser within an HVAC unit. In addition, Patent Document 3 discloses a heat-pump-type vehicular air-conditioning system configured with an evaporator on an upstream side and an onboard condenser connected via an expansion valve on a downstream side disposed within an HVAC unit, uses two four-way valves on a refrigerant inlet side of the onboard condenser, is connected to a discharge side of a compressor via a vehicle-mounted external heat exchanger functioning as one of a condenser and an evaporator or via a bypass circuit thereof, and has a refrigerant outlet side of the evaporator connected to an inlet side of the compressor by the two four-way valves via the vehicle-mounted external heat exchanger or via the bypass circuit thereof.

CITATION LIST

Patent Literature(s)

Patent Document 1: Japanese Unexamined Patent Application Publication No. 2012-96634A
Patent Document 2: Japanese Unexamined Patent Application Publication No. H11-170849A
Patent Document 3: Japanese Patent No. 3538845

SUMMARY OF INVENTION

Technical Problem

Patent Document 1 describes using the cooling refrigerant circuit of the current system as-is to configure the heat-pump-type system, and further has refrigerant flow in parallel, simultaneously or in alternation, to the external evaporator and the onboard evaporator during heating. This enables operation in a frost constraining mode, a dehumidifying heating mode, and the like. Nevertheless, this requires four heat exchangers, which enlarges the size of the system through complexity and raises costs. In addition, upon frosting of the external evaporator, defrosting by guiding hot gas is not possible. Defrosting is performed by heat dissipation from the external condenser, which is heated by the hot gas. As a result, not only is efficient defrosting not possible, but there is also a problem in that defrosting is difficult in situations where the outside air temperature is at or below 0° C., and the like.

In addition, Patent Documents 2 and 3 each describe systems having three heat exchangers. This results in complex configurations, enlargement, and increases in costs to be avoided. However, during heating, the air cooled and dehumidified by the onboard evaporator is reheated by the onboard condenser, and that air is blown into the vehicle cabin for heating. This leads to large reheating loss and does not provides sufficiently high wind temperatures. As a result, heating capabilities are likely to be insufficient. Accordingly, there is a problem in that an auxiliary heat source, such as an electric heater, must also be provided, and the like.

The present invention has been made in consideration of the foregoing, and an object thereof is to provide a heat-pump-type vehicular air-conditioning system in which the three heat exchangers used by a cooling refrigerant circuit in a current system are used. Sufficient cooling and heating capabilities are secured without reheating loss while the configuration is simplified, and miniaturization and decreased costs are made possible. Furthermore, operation in a frost formation delaying mode, a dehumidifying heating mode, and the like with respect to a vehicle-mounted external heat exchanger are made possible during heating.

Solution to Problem

In order to resolve the above-described problems, the heat-pump-type vehicular air-conditioning system of the present invention provides the following.

That is, a heat-pump-type vehicular air-conditioning system pertaining to a first aspect of the present invention includes a cooling refrigerant circuit having an electric compressor, a vehicle-mounted external heat exchanger, a receiver, a first decompression unit, and an onboard evaporator provided within an HVAC unit connected in the stated order; an onboard condenser disposed on a downstream side of the onboard evaporator within the HVAC unit, having a refrigerant inlet connected to a discharge circuit of the electric compressor via a switching unit, and a refrigerant outlet connected to the receiver; a first circuit having a second decompression unit connected between an outlet side of the receiver and one end side of the vehicle-mounted external heat exchanger, and a second circuit having a solenoid valve connected between another end side of the vehicle-mounted external heat exchanger and an intake circuit of the electric compressor, the solenoid valve being open during heating. A heating refrigerant circuit is configurable by connecting the electric compressor, the switching unit, the onboard condenser, the receiver, the first circuit having the second decompression unit, the vehicle-mounted external heat exchanger, and the second circuit having the solenoid valve, in the stated order. In a heating mode, upon frost formation on the vehicle-mounted external heat exchanger, defrosting is enabled by switching the heating refrigerant circuit to the cooling refrigerant circuit and directly guiding a hot gas from the electric compressor to the vehicle-mounted external heat exchanger.

According to the first aspect of the present invention, the cooling refrigerant circuit is configured by connecting the electric compressor, the vehicle-mounted external heat exchanger, the receiver, the first decompression unit, and the onboard evaporator provided within the HVAC unit in the stated order. In this cooling refrigerant circuit, the onboard condenser provided on the downstream side of the onboard evaporator within the HVAC unit is connected to the discharge circuit of the electric compressor via the switching unit, and the receiver is connected to the outlet side thereof. Also, the first circuit is provided having the second decompression unit connected between the outlet side of the receiver and the end side of the vehicle-mounted external heat exchanger, and the second circuit is provided having the solenoid valve connected between the other side of the vehicle-mounted external heat exchanger and the intake circuit of the electric compressor, the solenoid valve being open during heating. Thus, the heating refrigerant circuit is configurable by connecting the electric compressor, the switching unit, the onboard condenser, the receiver, the first circuit having the second decompression unit, the vehicle-mounted external heat exchanger, and the second circuit having the solenoid valve, in the stated order. As such, a system having three heat exchangers is configured, with the onboard condenser provided within the HVAC unit, the first circuit having the second decompression unit, and the second circuit having the solenoid valve in addition to the cooling refrigerant circuit that is substantially equivalent to the cooling refrigerant circuit of a current system. While in a cooling mode, two heat exchangers are functioning, namely the onboard evaporator and the vehicle-mounted external heat exchanger (functioning as a condenser). Likewise, while in a heating mode, two heat exchangers are functioning, namely the onboard condenser and the vehicle-mounted external heat exchanger (functioning as an evaporator). Thus, cooling operation and heating operations are both enabled without heat radiation loss and reheating loss. Accordingly, the cooling operation and the heating operation are performed efficiently at the maximum capability commensurate with the workload of the electric compressor, thus enabling the capabilities thereof to be enhanced. Also, the system is configured to use three heat exchangers, which enables simplification of the configuration, miniaturization, and cost reduction. In addition, while in the heating mode, upon frost formation on the vehicle-mounted external heat exchanger, effective defrosting is made possible by switching to the cooling circuit and directly guiding the hot gas to the vehicle-mounted external heat exchanger. As such, the defrosting time may be reduced and the range of outside air temperatures in which defrosting is possible may be expanded.

Furthermore, in the heat-pump-type vehicular air-conditioning system of a second aspect of the present invention, with respect to the above-described heat-pump-type vehicular air-conditioning system, the receiver is a check valve-equipped receiver having a check valve incorporated into a refrigerant flow inlet of a refrigerant circuit from each of the vehicle-mounted external heat exchanger connected to the receiver, and the onboard condenser.

According to the second aspect of the present invention, the receiver is a check valve-equipped receiver having a check valve incorporated into a refrigerant flow inlet of a refrigerant circuit from each of the vehicle-mounted external heat exchanger connected to the receiver, and the onboard condenser. As a result, the heating and cooling refrigerant circuits that are not used in a given operating mode are obstructed via the check valves incorporated into the refrigerant flow inlets of the receiver. Thus, despite the refrigerant flowing from the receiver into the circuits in a backward direction or in the forward direction of the check valves, the flow may be stopped in any situation where there is a difference in pressure between the front and rear. Accordingly, the flow of refrigerant into an unused circuit may be prevented. Also, in comparison to providing the receiver and the check valves separately in the refrigerant circuit, this enables a reduction in connecting components by omitting flanges and the like, enables the refrigerant circuit to be simplified, and leads to a reduction in costs.

Furthermore, in the heat-pump-type vehicular air-conditioning system of a third aspect of the present invention, with respect to either of the above-described heat-pump-type vehicular air-conditioning systems, the first decompression unit and the second decompression unit are each decompression units equipped with an on-off valve function, and the vehicle-mounted external heat exchanger and the onboard evaporator are jointly usable as evaporators while in the heating mode and while in a dehumidifying heating mode by using the on-off valve function of the first decompression unit and the second decompression unit.

According to the third aspect of the invention, the first decompression unit and the second decompression unit are each decompression units equipped with the on-off valve function, and the vehicle-mounted external heat exchanger and the onboard evaporator are jointly usable as evaporators while in the heating mode and while in the dehumidifying heating mode by using the on-off valve function of the first decompression unit and the second decompression unit. As such, operation in the dehumidifying heating mode is made possible by operating with the heating mode as the operating mode, simultaneously using the on-off valve function of the first decompression unit, controlling the opening and closing thereof to have a portion of the refrigerant flow into the onboard evaporator, and then cooling and dehumidifying the air therewith. Here, the temperature linearity performance (tracking performance with respect to the setting temperature) may be secured while in the dehumidifying heating mode by changing the temperature of the air blown from the onboard evaporator through opening and closing of the on-off valve function. In addition, while in the heating mode, under conditions of frost formation on the vehicle-mounted external heat exchanger, a frost formation delaying mode is used by performing on-off control of the on-off valve functions of the first decompression unit and the second decompression unit in alternation, causing a portion of the refrigerant to circulate in the onboard evaporator through the first decompression unit, and decreasing the amount of refrigerant circulating to the vehicle-mounted external heat exchanger. As such, the formation of frost and the progression thereof may be delayed while constraining fluctuations in the temperature of blown air, thus enabling stable heating operations to continue. Accordingly, the heating performance of the heat-pump-type vehicular air-conditioning system may be enhanced.

Furthermore, in the heat-pump-type vehicular air-conditioning system of a fourth aspect of the present invention, with respect to the above-described heat-pump-type vehicular air-conditioning system, the first decompression unit and the second decompression unit are each one of a solenoid valve-equipped temperature-driven automatic expansion valve and an electronic expansion valve.

According to the fourth aspect of the present invention, the first decompression unit and the second decompression unit are each one of a solenoid valve-equipped temperature-driven automatic expansion valve and an electronic expansion valve. As such, in a situation where the first decompression unit and the second decompression unit are solenoid valve-equipped temperature-driven automatic expansion valves, the refrigerant may be enabled to flow or obstructed from flowing by opening and closing the solenoid valves. This enables the degree of refrigerant superheating in the outlet of the vehicle-mounted external heat exchanger and the outlet of the onboard evaporator to be respectively made constant by the temperature-driven automatic expansion valve upon opening the solenoid valve, thus controlling the amount of refrigerant flow. In addition, in a situation where an electronic expansion valve is used, the refrigerant may be enabled to flow or obstructed from flowing by fully closing and fully opening the electronic expansion valve. The degree of refrigerant superheating in the outlet of the vehicle-mounted external heat exchanger and the outlet of the onboard evaporator may be controlled by a degree of opening adjustment function of the electronic expansion valve. Accordingly, the first decompression unit and the second decompression unit are used in alternation by using the on-off valve function thereof in accordance with the operating mode. Also, while in the heating mode or the dehumidifying heating mode, the vehicle-mounted external heat exchanger and the onboard evaporator are used together to perform operations. Here, the solenoid valve-equipped temperature-driven automatic expansion valve of the present invention includes, as an alternative to the solenoid valve and the temperature-driven automatic expansion valve that are integrated, a configuration in which a solenoid valve and a temperature-driven automatic expansion valve are independent, separate, and connected in series. In the present invention, the electronic expansion valve having the above-described functions is added to the decompression units having the on-off valve functions.

Furthermore, in a heat-pump-type vehicular air-conditioning system according to a fifth aspect of the present invention, with respect to any of the above-described heat-pump-type vehicular air-conditioning systems, the first decompression unit is a decompression unit equipped with an on-off valve function, the first circuit having the second decompression unit is provided with a check valve acting as an alternative unit of the on-off valve function and having tolerance only for refrigerant flow from the outlet side of the receiver to the vehicle-mounted external heat exchanger, and the vehicle-mounted external heat exchanger and the onboard evaporator are jointly usable as evaporators while in the heating mode and while in the dehumidifying heating mode by using the on-off valve function of the first decompression unit and the solenoid valve of the second circuit.

According to the fifth aspect of the present invention, the first decompression unit is a decompression unit equipped with an on-off valve function. The first circuit having the second decompression unit is provided with the check valve acting as an alternative unit of the on-off valve function and having tolerance only for refrigerant flow from the outlet side of the receiver to the vehicle-mounted external heat exchanger. Also, the vehicle-mounted external heat exchanger and the onboard evaporator are jointly usable as evaporators while in the heating mode and while in the dehumidifying heating mode by using the on-off valve function of the first decompression unit and the solenoid valve of the second circuit. As such, operation in the dehumidifying heating mode is made possible by operating with the heating mode as the operating mode, simultaneously using the on-off valve function of the first decompression unit, controlling the opening and closing thereof to have a portion of the refrigerant flow into the onboard evaporator, and then cooling and dehumidifying the air therewith. Here, the temperature linearity performance (tracking performance with respect to the setting temperature) may be secured while in the dehumidifying heating mode by changing the temperature of the air blown from the onboard evaporator through opening and closing of the on-off valve function. In addition, while in the heating mode, under conditions of frost formation on the vehicle-mounted external heat exchanger, a frost formation delaying mode is used by performing on-off control of the on-off valve functions of first decompression unit and of the solenoid valve of the second decompression unit in alternation, causing a portion of the refrigerant to circulate in the onboard evaporator through the first decompression unit, and decreasing the amount of refrigerant circulating to the vehicle-mounted external heat exchanger. As such, the formation of frost and the progression thereof may be delayed while constraining fluctuations in the temperature of blown air, thus enabling stable heating operations to continue. Accordingly, the heating performance of the heat-pump-type vehicular air-conditioning system may be enhanced.

Furthermore, in a heat-pump-type vehicular air-conditioning system according to a sixth aspect of the present invention, with respect to any of the above-described heat-pump-type vehicular air-conditioning systems, while in the dehumidifying heating mode, on-off control of the on-off valve function of the first decompression unit is performed in accordance with a temperature of one of air blown from the onboard evaporator and a fin thereof, so as to cause one of flow and obstruction of refrigerant to the onboard evaporator.

According to the sixth aspect of the present invention, while in the dehumidifying heating mode, on-off control of the on-off valve function of the first decompression unit is performed in accordance with a temperature of one of air blown from the onboard evaporator and a fin thereof, so as to cause one of flow and obstruction of refrigerant to the onboard evaporator. As such, during the dehumidifying heating performed by heating the air that has been cooled and dehumidified by the onboard evaporator in the onboard condenser provided on the downstream side, the temperature linearity performance cannot be secured by simply heating the air that has been cooled and dehumidified by the onboard evaporator in the onboard condenser and blowing the air as-is. However, the temperature of the blown air may be changed by causing the refrigerant to flow or preventing the refrigerant from flowing to the onboard evaporator in response to one of the temperature of the air blown from the onboard evaporator and the fin thereof, thus changing the refrigerant volume in the onboard evaporator. Accordingly, the temperature linearity performance may also be reliably secured in the dehumidifying heating mode.

Furthermore, in a heat-pump-type vehicular air-conditioning system according to a seventh aspect of the present invention, with respect to any of the above-described heat-pump-type vehicular air-conditioning systems, while in the heating mode, the on-off control of the on-off valve function of the first decompression unit and on-off control of one of the on-off valve function of the second decompression unit and the solenoid valve of the second circuit are performed in alternation, in accordance with an outlet refrigerant temperature of the vehicle-mounted external heat exchanger and the temperature of one of the air blown from the onboard evaporator and the fin thereof, so as to cause one of flow and obstruction of the refrigerant to the vehicle-mounted external heat exchanger and the onboard evaporator, in alternation.

According to the seventh aspect of the present invention, while in the heating mode, the on-off control of the on-off valve function of the first decompression unit and the on-off control of one of the on-off valve function of the second decompression unit and the solenoid valve of the second circuit are performed in alternation, in accordance with an outlet refrigerant temperature of the vehicle-mounted external heat exchanger and the temperature of one of the air blown from the onboard evaporator and the fin thereof. This causes one of flow and obstruction of the refrigerant to the vehicle-mounted external heat exchanger and the onboard evaporator, in alternation. As such, while in the heating mode, under circumstances of frost formation on an external evaporator, the refrigerant may be caused to flow or obstructed from flowing to the vehicle-mounted external heat exchanger and the onboard evaporator in alternation, in accordance with the outlet refrigerant temperature of the vehicle-mounted external heat exchanger and the temperature of one of the air blown from the onboard evaporator and the fin thereof, resulting in a frost formation delaying mode and thus reducing the amount of refrigerant circulating to the vehicle-mounted external heat exchanger. As such, frost formation and the progression thereof on the external evaporator may be delayed. Conversely, the decrease in temperature of the blown air due to cooling in the onboard evaporator may be constrained. Operation is made possible within a fixed range of temperature fluctuations by repeating these actions. Accordingly, during heating, frost formation and the progress thereof on the external evaporator may be delayed, and stable operation is able to continue during the heating operation while constraining the fluctuations in the temperature of the blown air.

Advantageous Effects of Invention

According to the present invention, a system having three heat exchangers is configured, with the onboard condenser provided within the HVAC unit, the first circuit having the second decompression unit, and the second circuit having the solenoid valve in addition to the cooling refrigerant circuit that is substantially equivalent to the cooling refrigerant circuit of a current system. While in a cooling mode, two heat exchangers are functioning, namely the onboard evaporator and the vehicle-mounted external heat exchanger (functioning as a condenser). Likewise, while in a heating mode, two heat exchangers are functioning, namely the onboard condenser and the vehicle-mounted external heat exchanger (functioning as an evaporator). Thus, cooling operation and heating operation are both enabled without heat radiation loss and reheating loss. As such, the cooling operation and the heating operation are performed efficiently at the maximum capability commensurate with the workload of the electric compressor, thus enabling the capabilities thereof to be enhanced. Also, the system is configured to use three heat exchangers, which enables simplification of the configuration, miniaturization, and cost reduction. In addition, while in the heating mode, upon frost formation on the vehicle-mounted external heat exchanger, effective defrosting is made possible by switching to the cooling circuit and directly guiding the hot gas to the vehicle-mounted external heat exchanger. As such, the defrosting time may be reduced and the range of outside air temperatures in which defrosting is possible may be expanded.

BRIEF DESCRIPTION OF DRAWING(S)

FIGS. 2A, 2B and 2C depict a receiver incorporated into the heat-pump-type vehicular air-conditioning system, where FIG. 2A is a cross-sectional view, FIG. 2B is a plan view, and FIG. 2C is a cross-sectional view along line a-a of FIG. 2B.

DESCRIPTION OF EMBODIMENTS

Embodiments of the present invention are described below, with reference to the accompanying drawings.

First Embodiment

A first embodiment of the present invention is described below, with reference to FIGS. 1 through 7.

Figure 1:
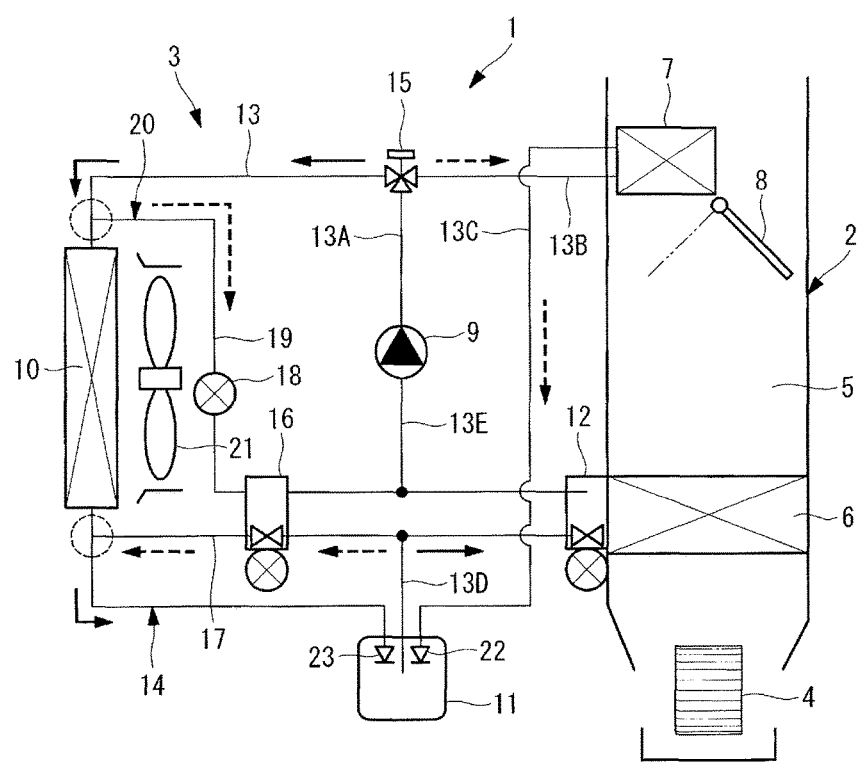
FIG. 1 is a refrigerant circuit diagram of a heat-pump-type vehicular air-conditioning system pertaining to a first embodiment of the present invention.
Figure 3:
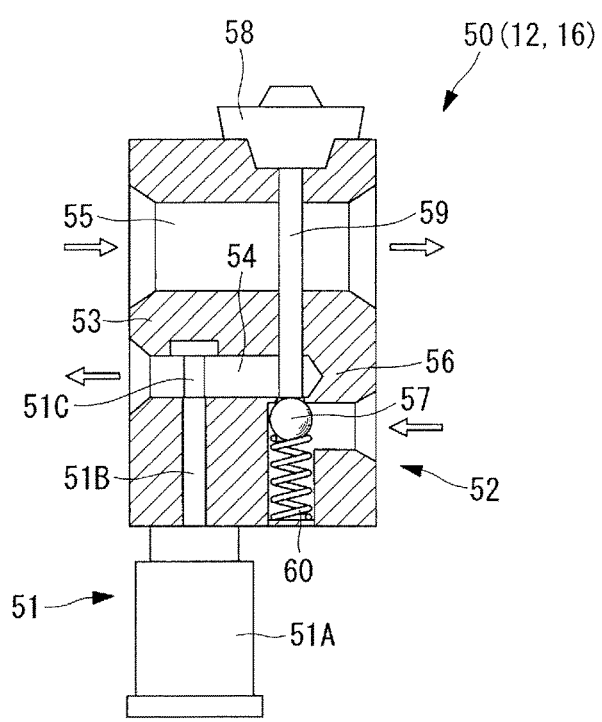
FIG. 3 is a configuration diagram of a solenoid valve-equipped temperature-driven automatic expansion valve incorporated into the heat-pump-type vehicular air-conditioning system.

FIG. 1 is a refrigerant circuit diagram illustrating a heat-pump-type vehicular air-conditioning system pertaining to the first embodiment of the present invention. FIGS. 2A, 2B and 2C are configuration diagrams of a receiver incorporated into the system. FIG. 3 is a configuration diagram illustrating a temperature-driven automatic expansion valve equipped with a solenoid valve and also incorporated into the system.

A heat-pump-type vehicular air-conditioning system 1 pertaining to the present embodiment includes a heating ventilation and air conditioning unit (HVAC unit) 2 and a refrigerant circuit 3 capable of heating and cooling, being a heat-pump-type circuit.

The HVAC unit 2 includes a blower 4 switching between drawing one of outside air and inside air from inside a vehicle cabin, and blowing the air to a downstream side, an onboard evaporator 6 disposed on an upstream side of an air flow channel 5 continuous with the blower 4, an onboard condenser 7 disposed on the downstream side thereof, and an air mix damper 8 adjusting the proportion of air volume circulating through to air volume bypassing the onboard condenser 7, thereby adjusting the temperature of conditioned air blowing into the vehicle cabin. The HVAC unit 2 is disposed in an instrument panel on the vehicle cabin side, and is configured to selectively blow conditioned air into the vehicle cabin interior from a plurality of air vents open toward the vehicle cabin interior.

The refrigerant circuit 3, which is capable of cooling and heating operations and is a heat-pump-type circuit, includes a cooling refrigerant circuit (cooling cycle) 14 for an off-cycle, in which an electric compressor 9 compressing a refrigerant, a vehicle-mounted external heat exchanger (functioning as condenser during cooling and as an evaporator during heating) 10, a receiver 11, a first decompression unit 12 equipped with an on-off valve function, and the onboard evaporator 7 provided within the HVAC unit 2 are connected in the stated order via a refrigerant pipe 13. The cooling refrigerant circuit 14 may be considered substantially equivalent to a refrigerant circuit used in a current vehicular air conditioning system applicable to an engine-driven vehicle.

In the heat-pump-type refrigerant circuit 3, the onboard condenser 7 disposed within the HVAC unit 2 is further connected to a discharge pipe (discharge circuit) 13A from the electric compressor 9, via a three-way switching valve (switching unit) 15. The onboard condenser 7 is connected to a refrigerant pipe 13B from the three-way switching valve 15 on a refrigerant inlet side, and connected to the receiver 11 via a refrigerant pipe 13C on a refrigerant outlet side. As such, the onboard condenser 7 is configured to be connected in parallel to the vehicle-mounted external heat exchanger 10 disposed in the cooling refrigerant circuit 14.

In addition, a first circuit 17 for heating is connected between an exit refrigerant pipe 13D of the receiver 11 and a refrigerant outlet side of the vehicle-mounted external heat exchanger 10 during cooling operations (one end side of the vehicle-mounted external heat exchanger 10). The first circuit 17 is equipped with a second decompression unit 16 having an on-off valve function. In addition, a second circuit 19 for heating is connected between a refrigerant inlet side of the vehicle-mounted external heat exchanger 10 during cooling operations (the other end side of the vehicle-mounted external heat exchanger 10) and an intake pipe (intake circuit) 13E for the electric compressor 9. The second circuit 19 is equipped with a solenoid valve 18.

As a result, a heating refrigerant circuit (heating cycle) 20 of the off-cycle is configurable as the electric compressor 9, the three-way switching valve 15, the onboard condenser 7 provided within the HVAC unit 2, the receiver 11, the first circuit 17 equipped with the second decompression unit 16 having an on-off valve function, the vehicle-mounted external heat exchanger 10, and the second circuit 19 equipped with the solenoid valve 18 being connected in the stated order via the refrigerant pipes 13A, 13B, 13C, 13D, 13E, and the like. Here, a fan 21 is equipped onto the vehicle-mounted external heat exchanger 10 in order to circulate outside air.

Furthermore, the receiver 11 of the present embodiment integrally incorporates check valves 22, 23 at two refrigerant flow inlets respectively connected to the refrigerant pipe 13C from the onboard condenser 7 and the refrigerant pipe 13 from the vehicle-mounted external heat exchanger 10, being a check valve-equipped receiver 11. As illustrated in FIGS. 2A, 2B, and 2C, the receiver 11 includes a main body 30 in the shape of a cylinder having a bottom, a lid 31 welded onto an open end portion of the main body 30, a refrigerant effluent pipe 32 connected at one end to the lid 31 and extending to the vicinity of the bottom of the main body 30 at another end, and a dryer 36 configured from a drying agent 35 filling a space between a pair of top and bottom filters 33, 34 disposed in an upper part of the interior of the main body 30, being a check valve-equipped receiver 11 having an internal dryer.

As described above, the lid 31 is provided with two refrigerant flow inlets 37, 38 respectively connected to the refrigerant pipe 13C and the refrigerant pipe 13 from the vehicle-mounted external heat exchanger 10, and with a refrigerant flow outlet 39 connected to the exit refrigerant pipe 13D. Fitting portions 40, 41, 42 are respectively provided on the refrigerant flow inlets 37, 38 and the refrigerant flow outlet 39 in order to connect the refrigerant pipes. The refrigerant pipes 13, 13C and the exit refrigerant pipe 13D are connected via the fitting portions 40, 41, 42. In addition, the check valves 22, 23 are respectively incorporated into the refrigerant flow inlets 27, 28, via a retaining ring and stoppers 43, 44.

In addition, a solenoid valve-equipped temperature-driven automatic expansion valve 50 as illustrated in FIG. 3 may be used as the first decompression unit 12 and the second decompression unit 16 having the on-off valve function.

The solenoid valve-equipped temperature-driven automatic expansion valve 50 is provided on the refrigerant inlet side of the onboard evaporator 6 and the vehicle-mounted external heat exchanger 10 functioning as an evaporator. A valve body 53 provided with an inlet-side refrigerant channel 54 operative with the evaporators and with an outlet-side refrigerant channel 55, a solenoid valve 51 opening and closing the inlet-side refrigerant channel 54 provided on the valve body 53, and a temperature-driven automatic expansion valve 52 provided with a ball valve 57 sitting on and adjusting a degree of opening of a valve seat member 56 provided on the inlet-side refrigerant channel 54 are integrated into the solenoid valve-equipped temperature-driven automatic expansion valve 50.

The solenoid valve 51 includes an electromagnetic coil 51A, a movable iron core 51B, and a valve 51C provided on a tip of the movable iron core 51B, opening and closing the inlet-side channel 54. The solenoid valve 51 is configured such that electricity passing through the electromagnetic coil 51A causes the movable iron core 51B to advance or retreat in an axial direction, in turn causing the valve 51C to open and close the inlet-side channel 54. In addition, the temperature-driven automatic expansion valve 52 detects the temperature and pressure of the refrigerant in the outlet-side refrigerant channel 55, through which the refrigerant evaporated by the onboard evaporator 6 and the vehicle-mounted external heat exchanger 10 passes, via a temperature sensing tube and a diaphragm 58. The temperature-driven automatic expansion valve 52 is also configured to cause a shaft 59 to advance and retreat through the difference in pressure, and to adjust a degree of opening by pressing the ball valve 57, which is biased by a spring 60. Here, in order to reduce costs, the solenoid valve 51 and the temperature-driven automatic expansion valve 52 may also be configured as an independent and individual standard solenoid valve and temperature-driven automatic expansion valve connected in series.

During operation using one or both of the onboard evaporator 6 and the vehicle-mounted external heat exchanger 10 functioning as an evaporator using the above-described solenoid valve-equipped temperature-driven automatic expansion valve 50, the solenoid valve 51 is open, and the refrigerant that has undergone adiabatic expansion is supplied through the inlet-side channel 54 by the temperature-driven automatic expansion valve 52 to the onboard evaporator 6 and the vehicle-mounted external heat exchanger 10. As such, the amount of refrigerant flow can be automatic controlled by the temperature-driven automatic expansion valve 52 such that the degree of refrigerant superheating in the evaporator outlets is fixed. As a result, this enables the configuration to be simplified and the cost to be reduced in comparison to a system using an electronic expansion valve requiring a refrigerant pressure detecting unit and a refrigerant temperature detecting unit. However, in the present invention, an electronic expansion valve may be used as a replacement for the solenoid valve-equipped temperature-driven automatic expansion valve 50 as the first decompression unit 12 and the second decompression unit 16 having the on-off valve function. Use of the electronic expansion valve is not excluded.

In the above-described heat-pump-type vehicular air-conditioning system 1, while in a cooling mode, the refrigerant compressed by the electric compressor 9 flows through the three-way switching valve 15, the vehicle-mounted external heat exchanger 10 functioning as a condenser, the receiver 11, the first decompression unit 12 having the on-off valve function, and the onboard evaporator 6, in the stated order as indicated by the solid line arrows, and then returns to the electric compressor 9 to circulate in the cooling refrigerant circuit (cooling cycle) 14. Conversely, while in a heating mode, the refrigerant compressed by the electric compressor 9 flows through the three-way switching valve 15, the onboard condenser 7, the receiver 11, the first circuit 17 equipped with the second decompression unit 16 having the on-off valve function, the vehicle-mounted external heat exchanger 10 functioning as an evaporator, and the second circuit 19 equipped with the solenoid valve 18, in the stated order as indicated by the dashed line arrows, and then returns to the electric compressor 9 to circulate in the heating refrigerant circuit (heating cycle) 20.

Here, under frost-forming conditions in which outside air temperatures are low, continued heating operation leads to frost formation on the vehicle-mounted external heat exchanger 10 functioning as an evaporator. The spread of frost leads to a situation where the vehicle-mounted external heat exchanger 10 is completely frozen, which impedes heat exchange with the outside air and may make heating impossible. However, despite frost formation on the vehicle-mounted external heat exchanger 10, delaying the spread thereof enables stable heating operation to continue. As such, the present embodiment employs the following configuration during the heating mode, in order to delay the progression of frost formation on the vehicle-mounted external heat exchanger 10.

That is, the solenoid valve-equipped temperature-driven automatic expansion valve 50 illustrated in FIG. 3 serves as the first decompression unit 12 and the second decompression unit 16 having the on-off valve function. As such, during the heating mode, in which the refrigerant flows as indicated by the dashed line arrows, in a situation where, for example, an outlet refrigerant temperature of the vehicle-mounted external heat exchanger 10 reaches or drops below a setting temperature and there is a risk of frost formation on the vehicle-mounted external heat exchanger 10, then the solenoid valve 51 is closed on the solenoid valve-equipped temperature-driven automatic expansion valve 50 handling the on-off valve function of the second decompression unit 16. Conversely, the solenoid valve 51 is open on the solenoid valve-equipped temperature-driven automatic expansion valve 50 handling the on-off valve function of the first decompression unit 12, and the refrigerant flows to the onboard evaporator 6 side. As a result, the onboard evaporator 6 function as an evaporator, and the heating operation continues. As a result, the heat absorbing capability of the vehicle-mounted external heat exchanger 10 is decreased so that the progression of frost formation may be controlled.

In such a case, a situation may arise in which the onboard evaporator 6 is active in a dehumidifying heating operation, and the temperature of the conditioned air heated by the onboard condenser 7 and blown out cannot be maintained at the setting temperature. As such, for example, the temperature of one of air blown from the onboard evaporator 6 and a fin thereof is detected. Upon the detected temperature reaching or falling below the setting value, the on-off valve function of the first decompression unit 12 (the solenoid valve 51 of the solenoid valve-equipped temperature-driven automatic expansion valve 50) is closed and the on-off valve function of the second decompression unit 16 (the solenoid valve 51 of the solenoid valve-equipped temperature-driven automatic expansion valve 50) is opened, such that the refrigerant flows to the vehicle-mounted external heat exchanger 10 side. A configuration in which stable heating operation is able to continue while delaying the formation of frost and constraining temperature fluctuations to within a fixed range is realized by repeating these operations.

Furthermore, in the present embodiment, the onboard condenser 8 and the onboard evaporator 7 are able to act simultaneously, to operate in a dehumidifying heating mode. That is, the solenoid valve-equipped temperature-driven automatic expansion valve 50 having the on-off valve function serves as the first decompression unit 12 and the second decompression unit 16. As such, the refrigerant circuit switches to the heating refrigerant circuit (heating cycle) 20. The refrigerant discharged from the electric compressor 9 flows through the three-way switching valve 15, the onboard condenser 8, the receiver 11, the second decompression unit 16 having the on-off valve function, the vehicle-mounted external heat exchanger 10, and the solenoid valve 19 in the stated order as indicated by the dashed line arrows, then returns to the electric compressor 9 to circulate in the heating cycle 20, and the on-off valve function of the first decompression unit 12 is simultaneously opened. As such, this enables a portion of the refrigerant to circulate in the onboard evaporator 6.

As a result, the air cooled and dehumidified by the onboard evaporator 6 is heated by the onboard condenser 7 and blown into the vehicle cabin, thus enabling the dehumidifying heating operation. In such a situation, simply having the air cooled and dehumidified by the onboard evaporator 6 be heated by the onboard condenser 7 does not secure temperature linearity performance, by which the temperature of the air blown into the vehicle cabin is changed to track changes in the setting temperature. In the present embodiment, while in this dehumidifying heating mode, the refrigerant flows through the vehicle-mounted external heat exchanger 10 functioning as an evaporator and through the onboard evaporator 6, such that both evaporators are operating jointly. Meanwhile, for example, the temperature of one of the air blown out from the onboard evaporator 6 and the fin thereof is detected, and the on-off valve function of the first decompression unit 12 is controlled to open and close in accordance with the detected temperature such that the amount of cooling by the onboard evaporator 6 is adjusted. As a result, this enables the temperature linearity performance to also be secured.

As per the configuration described above, the following action and effects are produced according to the present embodiment.

Figure 4:
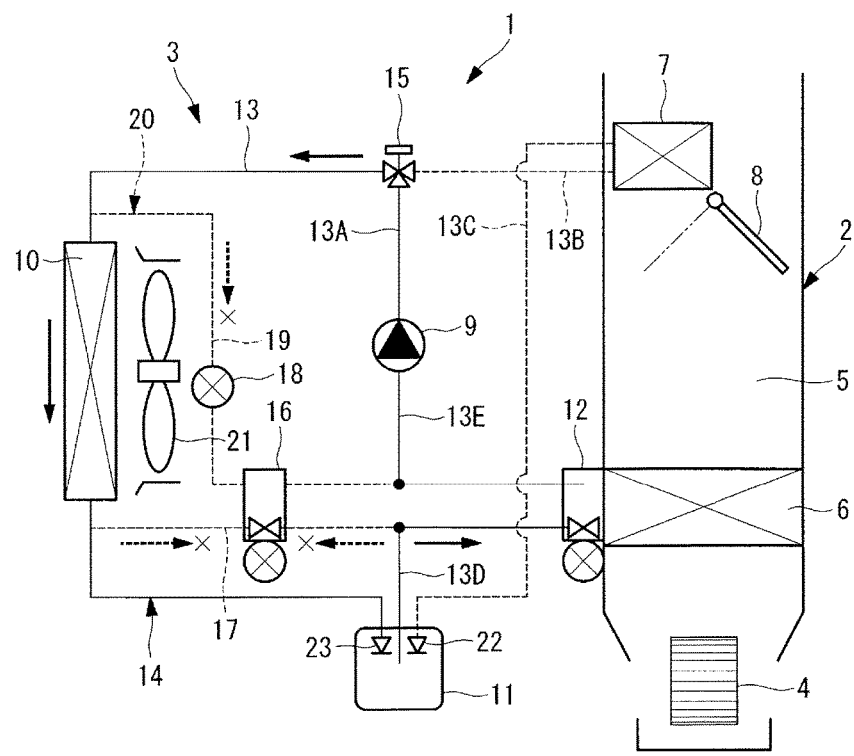
FIG. 4 is an explanatory diagram illustrating the state of refrigerant flow in the heat-pump-type vehicular air-conditioning system during a cooling mode (defrosting mode).

Firstly, while in the cooling mode, the refrigerant compressed by the electric compressor 9 is guided by the discharge pipe 13A through the three-way switching valve 15 to the vehicle-mounted external heat exchanger 10 functioning as a condenser, as illustrated in FIG. 4. The refrigerant then undergoes heat exchange with outside air blown through by the fan 21 and is made into a condensed liquid. Given that the solenoid valve 51 of the solenoid valve-equipped temperature-driven automatic expansion valve 50 making up the second decompression unit 16 is closed, this liquid refrigerant is guided through the check valve 23 to the receiver 11 and temporarily collected. Thereafter, the liquid refrigerant is guided through the exit refrigerant pipe 13D to the first decompression unit 12, is decompressed into a gas-liquid two-phase state, and is supplied to the onboard evaporator 6.

The refrigerant having undergone heat exchange with one of the inside air and the outside air blown from the blower 4 in the onboard evaporator 6 and evaporated is taken into the electric compressor 9 through the intake pipe 13E and recompressed. The same cycle is repeated below. This cooling cycle 14 may be used as-is, in cooperation with a cooling cycle of a current system used in an engine-driven vehicle, without making any changes thereto. The one of the inside air and the outside air cooled by heat exchange with the refrigerant during the process of passing through the onboard evaporator 6 is blown into the vehicle cabin and thus contributes to cooling of the vehicle cabin interior.

Figure 5:
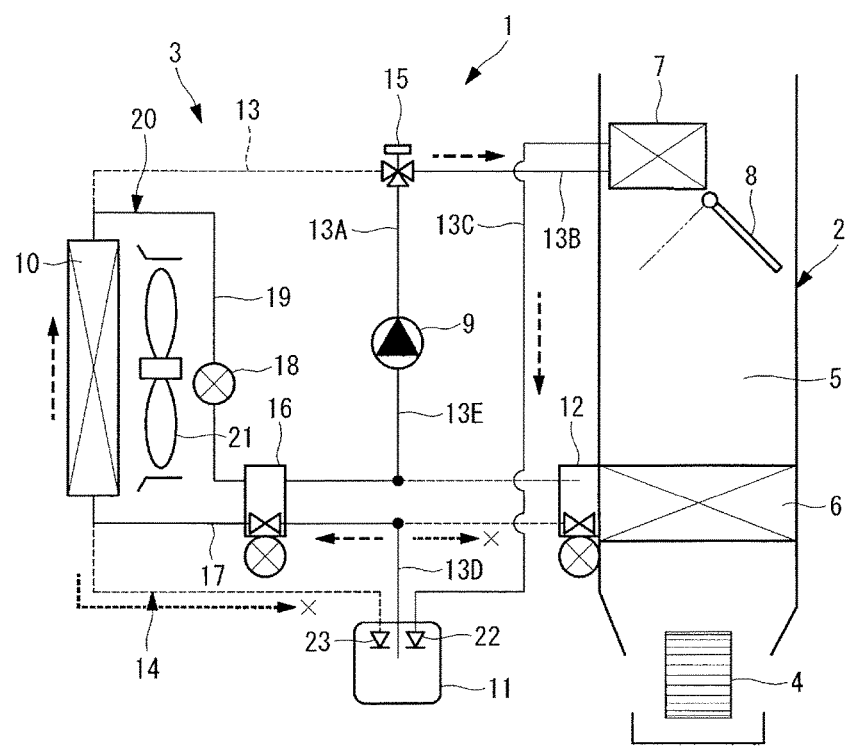
FIG. 5 is an explanatory diagram illustrating the state of refrigerant flow in the heat-pump-type vehicular air-conditioning system during a heating mode.

In addition, while in the heating mode, the refrigerant compressed by the electric compressor 9 is guided from the discharge pipe 13A through the three-way switching valve 15 and the refrigerant pipe 13B to the onboard condenser 7 as illustrated in FIG. 5, and then undergoes heat exchange with one of the inside air and the outside air blown from the blower 4. The air heated by this heat exchange is blown into the vehicle cabin, and thus contributes to heating of the vehicle cabin interior. Furthermore, the refrigerant that has undergone heat dissipation and has been condensed into a liquid by the onboard condenser 7 is guided through the refrigerant pipe 13C and the check valve 22 into the receiver 11 and temporarily collected. Thereafter, given that the solenoid valve 51 of the solenoid valve-equipped temperature-driven automatic expansion valve 50 making up the first decompression unit 12 is closed, the refrigerant is guided through the exit refrigerant pipe 13D and the first circuit 17 to the second decompression unit 16, is decompressed into a gas-liquid two-phase state, and is supplied to the vehicle-mounted external heat exchanger 10.

At this point, the refrigerant in the refrigerant pipe 13 connecting the vehicle-mounted external heat exchanger 10 and the receiver 11 is flowing in a forward direction with respect to the check valve 23. However, given that the refrigerant pipe 13 interior is at a low pressure and that the receiver 11 interior is at a high pressure, the difference in pressure maintains the check valve 23 in a closed state such that the refrigerant does not flow from the vehicle-mounted external heat exchanger 10 side through the refrigerant pipe 13 to the receiver 11. Accordingly, the refrigerant supplied to the vehicle-mounted external heat exchanger 10 undergoes heat exchange with the outside air blown through by the fan 21 in the vehicle-mounted external heat exchanger 10 functioning as an evaporator, absorbs heat from the outside air, and is evaporated. Thereafter, the refrigerant is taken in through the second circuit 19 equipped with the solenoid valve 18 and the intake pipe 13E to the electric compressor 9 and is recompressed. The same cycle is repeated below. As such, through this heating cycle 20, the outside air may be used as a heat source in heat pump heating.

However, while in the heating operation mode, depending on outside air conditions, frost formation may occur on the vehicle-mounted external heat exchanger 10 functioning as the evaporator, and the vehicle-mounted external heat exchanger 10 may freeze. In such a situation, the frost must be melted. In the present invention, switching the heating cycle 20 to the cooling cycle 14 as illustrated in FIG. 4 results in a defrosting mode. In this mode, hot gas discharged from the electric compressor 9 is directly guided into the vehicle-mounted external heat exchanger 10. As such, the vehicle-mounted external heat exchanger 10 is heated by the hot gas, which enables effective defrosting. As a result, defrosting is made possible despite low outside air temperatures at or below 0° C. without being affected by the temperature.

Figure 6:
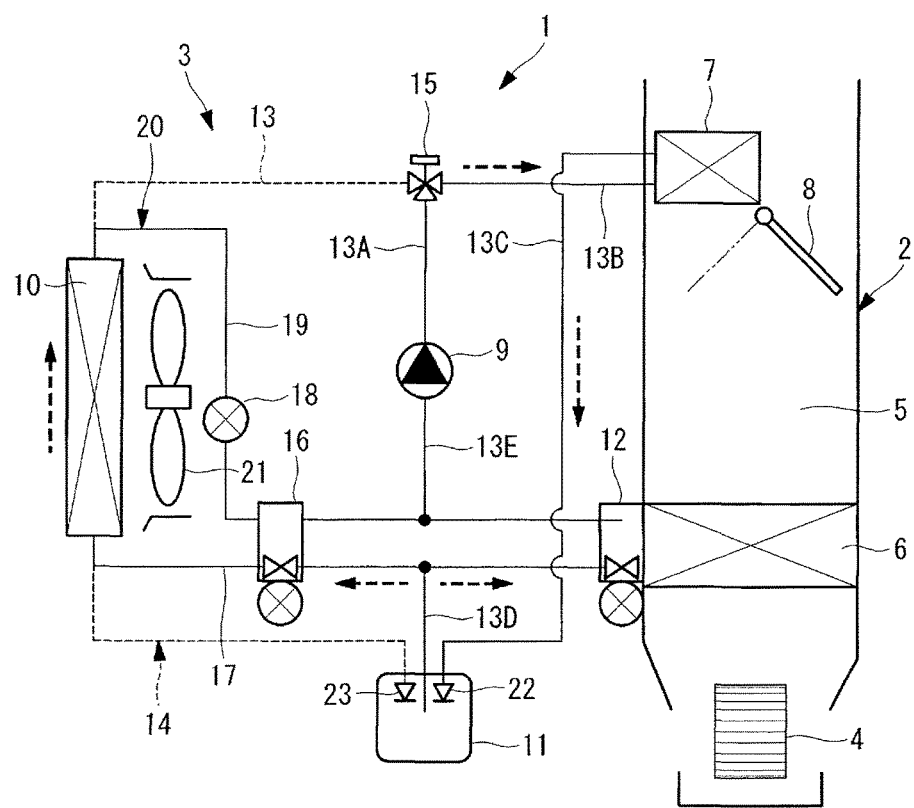
FIG. 6 is an explanatory diagram illustrating the state of refrigerant flow in the heat-pump-type vehicular air-conditioning system during a frost formation delaying mode.

However, in the present embodiment, during operation in the heating mode, in a situation where the outside air temperature drops and conditions of frost formation on the vehicle-mounted external heat exchanger 10 occur, for example, the outlet refrigerant temperature of the vehicle-mounted external heat exchanger 10 is detected. Upon the detected temperature reaching or falling below the setting temperature, as illustrated in FIG. 6, frost formation on the vehicle-mounted external heat exchanger 10 or the progress thereof may be delayed by switching to a frost formation delaying mode. In this frost formation delaying mode, the solenoid valve 51 of the solenoid valve-equipped temperature-driven automatic expansion valve 50 making up the first decompression unit 12 and the second decompression unit 16 is opened and closed in alternation while the heating cycle 20 is maintained, and the refrigerant also flows to the onboard evaporator 6. As such, the amount of refrigerant circulating to the vehicle-mounted external heat exchanger 10 is decreased and the heat absorbing capability is lowered in the vehicle-mounted external heat exchanger 10. As a result, the frost formation on the vehicle-mounted external heat exchanger 10 or the progression thereof may be constrained.

Here, in the frost formation delaying mode, once the outlet refrigerant temperature of the vehicle-mounted external heat exchanger 10 has reached or dropped below the setting temperature, the refrigerant is made to flow to the onboard evaporator 6 by closing the on-off valve function of the second decompression unit 16 and opening the on-off valve function of the first decompression unit 12, which constrains frost formation on the vehicle-mounted external heat exchanger 10. However, continued operation in this manner causes the air to be cooled by the evaporating action of the onboard evaporator 6, which lowers the temperature of the air heated by the onboard condenser 7 and blown into the vehicle cabin. As such, for example, the temperature of one of the air blown from the onboard evaporator 6 and the fin thereof is detected. Upon the detected temperature reaching or falling below the setting value, the on-off valve function of the first decompression unit 12 is closed and the on-off valve function of the second decompression unit 16 is opened, such that the refrigerant flows again to the vehicle-mounted external heat exchanger 10. Repeating these operations serves to constrain the range of fluctuations in the temperature of the air blown into the vehicle cabin while also constraining frost formation, such that no discomfort affects the rider.

Figure 7:
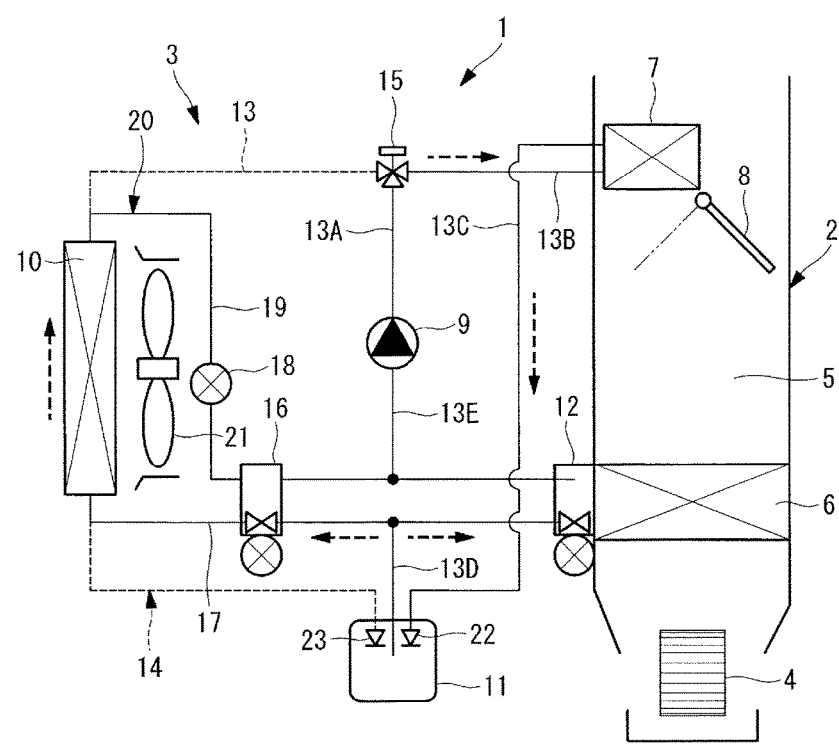
FIG. 7 is an explanatory diagram illustrating the state of refrigerant flow in the heat-pump-type vehicular air-conditioning system during a dehumidifying heating mode.
Figure 8:
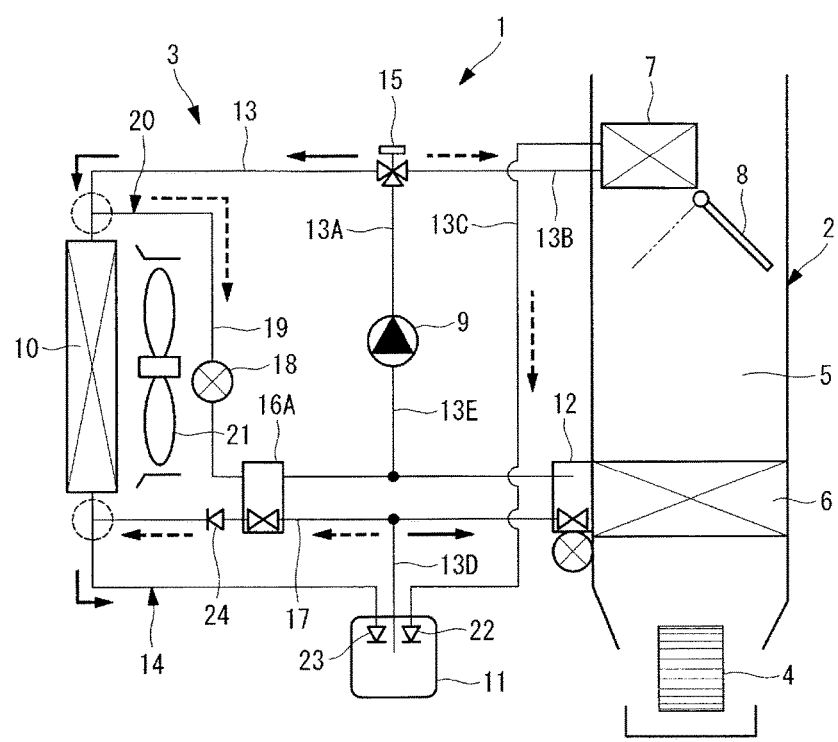
FIG. 8 is a refrigerant circuit diagram of a heat-pump-type vehicular air-conditioning system pertaining to a second embodiment of the present invention.

Furthermore, the present embodiment not only operates in the heating mode, but also uses the on-off valve function of the first decompression unit 12. As such, operation in the dehumidifying heating mode is also made possible. In this dehumidifying heating mode, as illustrated in FIG. 7, the solenoid valve 51 of the solenoid valve-equipped temperature-driven automatic expansion valve 50 making up the first decompression unit 12 is opened and closed while the heating cycle 20 of the heating mode is maintained, and the refrigerant also flows to the onboard evaporator 6 in parallel. As such, the air cooled and dehumidified by the onboard evaporator 6 is heated by the onboard condenser 7 and blown into the vehicle cabin, thereby performing the dehumidifying heating operation.

Here, only having the air cooled and dehumidified by the onboard evaporator 6 be heated by the onboard condenser 7 does not enable the temperature linearity performance, by which the temperature of the air blown into the vehicle cabin is changed to track a change in the setting temperature, to be secured. However, for example, the temperature of one of the air blown from the onboard evaporator 6 and the fin thereof is detected, the solenoid valve 51 of the vehicle-mounted external heat exchanger 50 making up the first decompression unit 12 is controlled to open and close in accordance with the detected temperature, and the amount of cooling performed by the onboard evaporator 6 is adjusted. As such, the temperature linearity performance may be secured.

Thus, according to the present embodiment, the heat-pump-type vehicular air-conditioning system 1 has three heat exchangers, given that the onboard condenser 7 provided in the HVAC unit 2 as well as the first circuit 17 having the second decompression unit 16 and the second circuit 19 having the solenoid valve 18 are provided in addition to the cooling refrigerant circuit 14 that is substantially equivalent to a cooling refrigerant circuit of a current system. In addition, two heat exchangers are functioning during the cooling mode, namely the onboard evaporator 6 and the vehicle-mounted external heat exchanger 10 (functioning as a condenser). Likewise, two heat exchangers are functioning during the heating mode, namely the onboard condenser 7 and the vehicle-mounted external heat exchanger 10 (functioning as an evaporator). As such, the cooling operation and the heating operation may both be performed without heat radiation loss and without reheating loss.

Accordingly, the cooling operation and the heating operation are performed efficiently at the maximum capabilities commensurate with the workload of the electric compressor 9, thus enhancing the capabilities thereof. Also, the heat-pump-type vehicular air-conditioning system 1 is configured with the three heat exchangers 6, 7, and 10, which enables simplification of the configuration, miniaturization, and cost reduction to be achieved. In addition, while in the heating mode, upon frost formation on the vehicle-mounted external heat exchanger 10 functioning as the evaporator, effective defrosting is made possible by switching to the cooling circuit 14 and directly guiding the hot gas to the vehicle-mounted external heat exchanger 10. As such, the defrosting time may be reduced and the range of outside air temperatures in which defrosting is possible may be expanded.

In addition, in the above-described heat-pump-type vehicular air-conditioning system 1, the receiver 11 has a check valve incorporated into each refrigerant flow inlet, being a check valve-equipped receiver 11. As a result, the heating and cooling refrigerant circuits 14, 20 that are not used in a given operating mode are obstructed through the check valves 22, 23 incorporated into the refrigerant flow inlets 37, 38 of the receiver 11. Thus, despite the refrigerant flowing from the receiver 11 into the refrigerant circuits 14, 20 in a backward direction or in the forward direction of the check valves, the flow may be stopped in any situation where there is a difference in pressure between the front and rear. Accordingly, the flow of refrigerant into the unused refrigerant circuits 14, 20 may be prevented. Also, in comparison to providing the receiver 11 and the check valves 22, 23 separately in the refrigerant circuit 3, this enables a reduction in connecting components by omitting flanges and the like, enables the refrigerant circuit 3 to be simplified, and leads to a reduction in costs.

In addition, the first decompression unit 12 and the second decompression unit 16 are on-off valve equipped decompression units. As such, operation in the dehumidifying heating mode is made possible by operating with the heating mode as the operating mode, simultaneously using the on-off valve function of the first decompression unit 12, controlling the opening and closing thereof to have a portion of the refrigerant flow into the onboard evaporator 6, and then cooling and dehumidifying the air therewith. Here, the temperature linearity performance (tracking performance with respect to the setting temperature) may be secured while in the dehumidifying heating mode by changing the temperature of the air blown from the onboard evaporator 6 through opening and closing of the on-off valve function.

Similarly, while in the heating mode, under conditions of frost formation on the vehicle-mounted external heat exchanger 10, the frost formation delaying mode is used to control the opening and closing of the on-off valve functions of the first decompression unit 12 and the second decompression unit 16 in alternation, circulate a portion of the refrigerant through the first decompression unit 12 to the onboard evaporator 6, and decrease the amount of refrigerant circulating to the vehicle-mounted external heat exchanger 10. As a result, stable heating operation may continue while delaying the formation of frost on the vehicle-mounted external heat exchanger 10 and the progression thereof, and constraining fluctuations in the temperature of blown air. Accordingly, the heating performance of the heat-pump-type vehicular air-conditioning system 1 may be enhanced.

Furthermore, the first decompression unit 12 and the second decompression unit 16 are the solenoid valve-equipped temperature-driven automatic expansion valve 50 or an electronic expansion valve. As such, in a situation where the first decompression unit 12 and the second decompression unit 16 are the solenoid valve-equipped temperature-driven automatic expansion valve 50, the refrigerant may be enabled to flow or obstructed from flowing by opening and closing the solenoid valve 51. This enables the degree of refrigerant superheating in the outlet of the vehicle-mounted external heat exchanger 10 and the outlet of the onboard evaporator 6 to be respectively controlled and made constant by the temperature-driven automatic expansion valve 52 upon opening the solenoid valve 51. In addition, in a situation where an electronic expansion valve is used, the refrigerant may be enabled to flow or obstructed from flowing by fully closing and fully opening the electronic expansion valve. The degree of refrigerant superheating in the outlet of the vehicle-mounted external heat exchanger 10 and the outlet of the onboard evaporator 6 may be controlled by a degree of opening adjustment function of the electronic expansion valve.

Accordingly, the first decompression unit 12 and the second decompression unit 16 are used in alternation by using the on-off valve function thereof in accordance with the operating mode. Also, while in the heating mode and the dehumidifying heating mode, the vehicle-mounted external heat exchanger 10 and the onboard evaporator 6 are used together to perform joint operations.

Here, the solenoid valve-equipped temperature-driven automatic expansion valve 50 of the present invention includes, as an alternative to the solenoid valve 51 and the temperature-driven automatic expansion valve 52 that are integrated, a configuration in which a solenoid valve and a temperature-driven automatic expansion valve are independent, separate, and connected in series. In the present invention, the electronic expansion valve having the above-described functions is added to the decompression units 12, 16 having the on-off valve functions.

Furthermore, in the present embodiment, during the dehumidifying heating mode, the opening and closing of the on-off valve function of the first decompression unit 12 is controlled in accordance with the temperature of one of the air blown from the onboard evaporator 6 and the fin thereof, and the refrigerant is caused to flow or is prevented from flowing to the onboard evaporator 6. As such, during the dehumidifying heating performed by heating the air that has been cooled and dehumidified by the onboard evaporator 6 in the onboard condenser 7 on the downstream side thereof, the temperature linearity performance cannot be secured by simply heating the air that has been cooled and dehumidified by the onboard evaporator 6 in the onboard condenser and blowing the air as-is. However, the temperature of the blown air may be changed by causing the refrigerant to flow or preventing the refrigerant from flowing to the onboard evaporator 6 in response to the temperature of one of the air blown from the onboard evaporator 6 and the fin thereof, thus changing the refrigerant volume in the onboard evaporator 6. Accordingly, the temperature linearity performance may also be reliably secured in the dehumidifying heating mode.

In addition, during the heating mode, under circumstances of frost formation on an external evaporator 10, the opening and closing of the on-off valve functions of the first decompression unit 12 and the second decompression unit 16 may be controlled in accordance with the outlet refrigerant temperature of the vehicle-mounted external heat exchanger 10 and the temperature of one of the air blown from the onboard evaporator 6 and the fin thereof, and the refrigerant may be caused to flow or prevented from flowing to the vehicle-mounted external heat exchanger 10 and the onboard evaporator 6 in alternation, thus reducing the amount of refrigerant circulating to the vehicle-mounted external heat exchanger 10. As such, the progression of frost formation on the external evaporator 10 may be delayed. Conversely, the decrease in temperature of the blown air due to cooling in the onboard evaporator 6 may be constrained. Operation is made possible within a fixed range of temperature fluctuations by repeating these actions. Accordingly, during heating, frost formation and the progress thereof on the external evaporator 10 may be delayed, and stable heating operation may continue while constraining fluctuations in the temperature of the blown air.

Second Embodiment

Next, a second embodiment of the present invention is described with reference to FIGS. 8 through 12.

The present embodiment differs from the above-described first embodiment only in that a second decompression unit 16A is equipped with a check valve. Other points of the second embodiment are similar to the first embodiment, and the description thereof is therefore omitted.

In the above-described first embodiment, the second decompression unit 16 is provided with the on-off valve function by using the solenoid valve-equipped temperature-driven automatic expansion valve 50. However, in the present embodiment, the second decompression unit 16A provided in the first circuit 17, which is for heating, is configured by removing the solenoid valve 51 from the solenoid valve-equipped temperature-driven automatic expansion valve 50 illustrated in FIG. 3, leaving a temperature-driven automatic expansion valve that is only the temperature-driven automatic expansion valve 52, and providing a check valve 24 only with a tolerance for refrigerant flow from the outlet side of the receiver 11 on an external evaporator 10 side toward the vehicle-mounted external heat exchanger 10 side.

As such, the second decompression unit 16A provided in the first circuit 17 is the temperature-driven automatic expansion valve 52 and does not have the on-off valve function. The configuration in which the check valve 24 is provided on the external evaporator 10 side thereof also enables respective operations in modes similar to the first embodiment as illustrated in FIGS. 9 through 12, namely the cooling mode (defrosting mode) illustrated in FIG. 9, the heating mode illustrated in FIG. 10, the frost formation delaying mode illustrated in FIG. 11, and the dehumidifying heating mode illustrated in FIG. 12.

Figure 9:
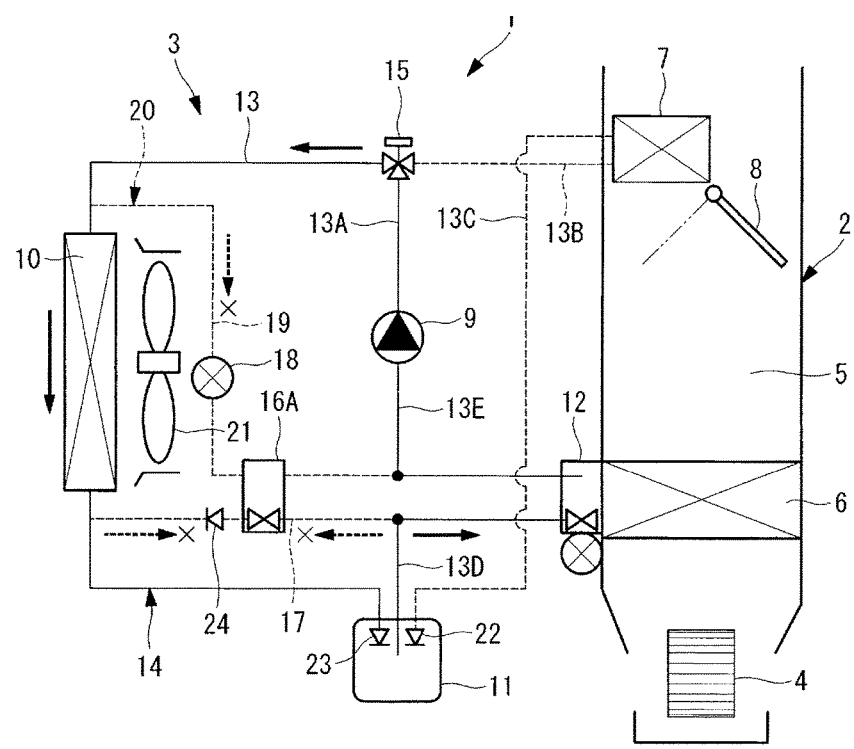
FIG. 9 is an explanatory diagram illustrating the state of refrigerant flow in the heat-pump-type vehicular air-conditioning system during the cooling mode (defrosting mode).
Figure 10:
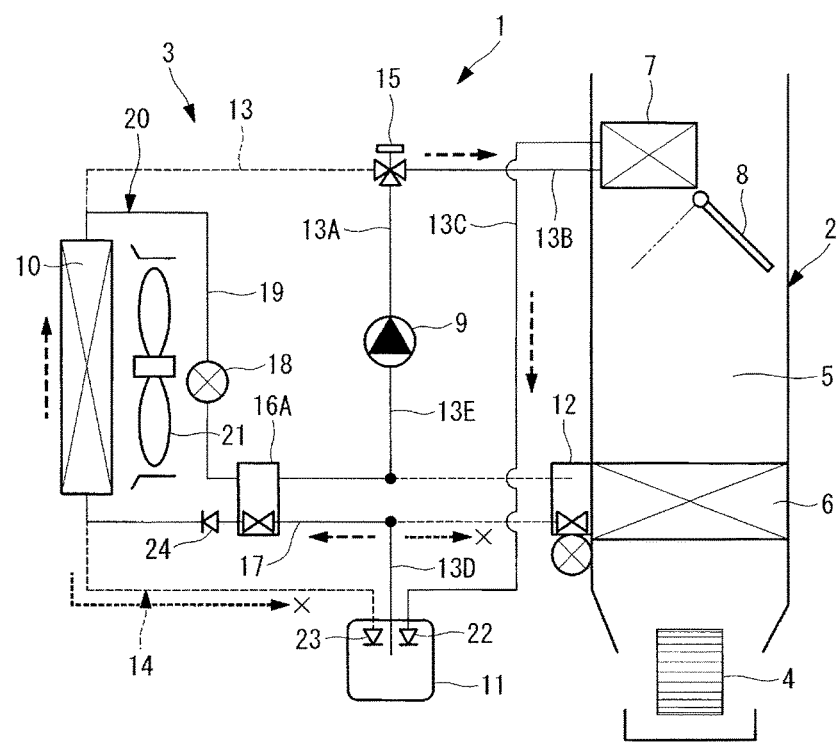
FIG. 10 is an explanatory diagram illustrating the state of refrigerant flow in the heat-pump-type vehicular air-conditioning system during the heating mode.
Figure 11:
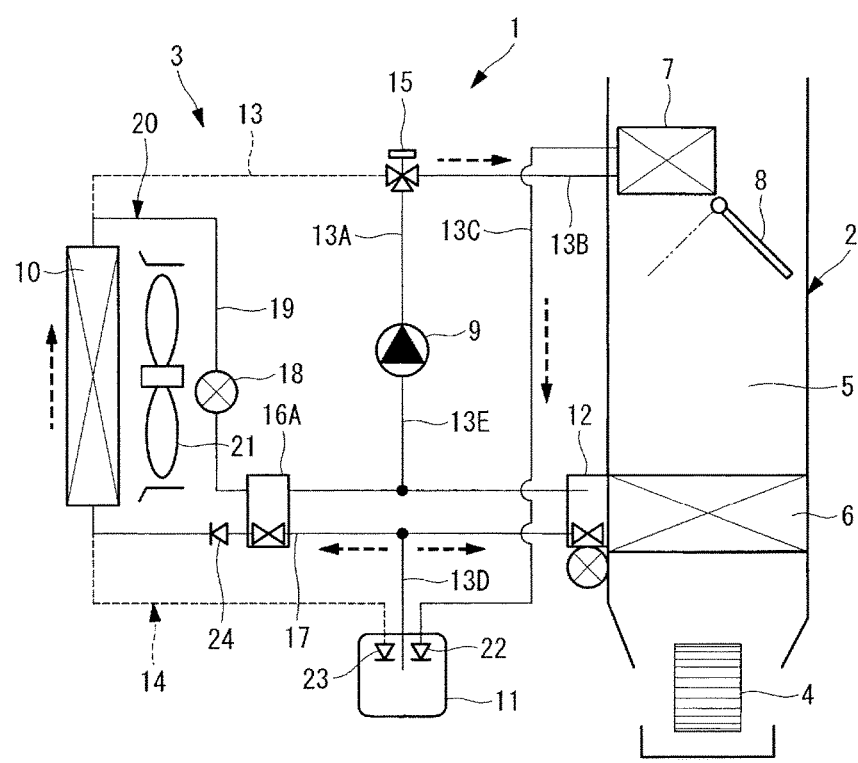
FIG. 11 is an explanatory diagram illustrating the state of refrigerant flow in the heat-pump-type vehicular air-conditioning system during the frost formation delaying mode.
Figure 12:
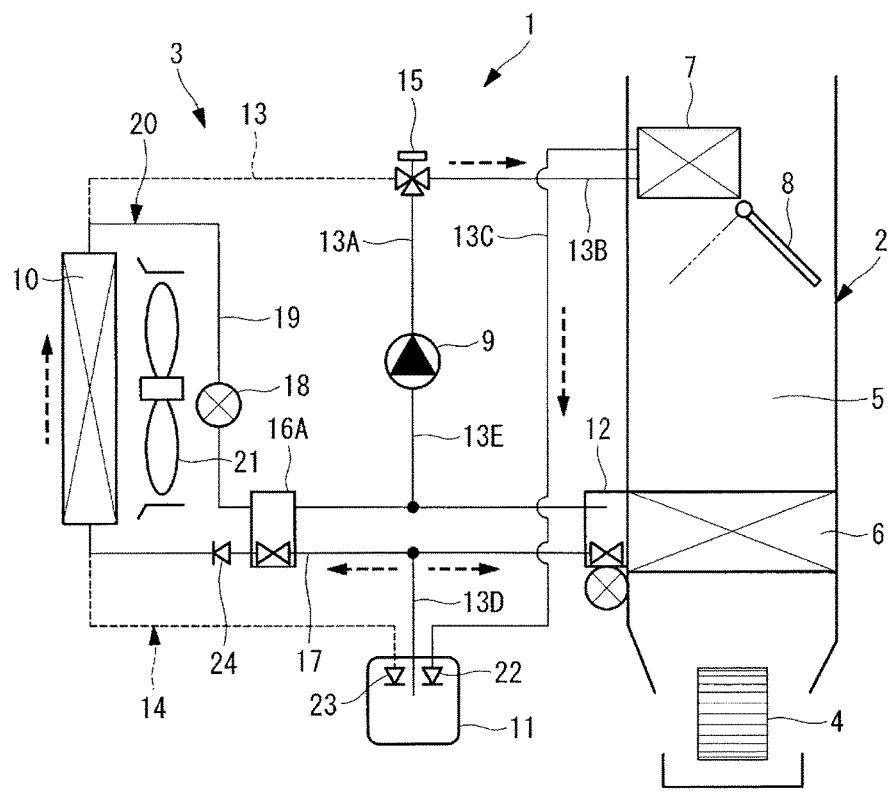
FIG. 12 is an explanatory diagram illustrating the state of refrigerant flow in the heat-pump-type vehicular air-conditioning system during the dehumidifying heating mode.

Here, while in the cooling mode illustrated in FIG. 9 and while in the defrosting mode, the refrigerant in the first circuit 17 flows in a forward direction with respect to the check valve 24, but is at high pressure on the external evaporator 10 side and at low pressure on the second decompression unit 16A side of the check valve 24. As a result, the difference in pressure maintains the check valve 24 in a closed state, such that the refrigerant does not flow from the outlet side of the receiver 11 through the first circuit 17 on the vehicle-mounted external heat exchanger 10 side.

Thus, in the present embodiment as well, operation in the dehumidifying heating mode is made possible by operating with the heating mode as the operating mode, simultaneously using the on-off valve function of the first decompression unit 12 (the solenoid valve-equipped temperature-driven automatic expansion valve 50), controlling the opening and closing thereof to have a portion of the refrigerant flow into the onboard evaporator 6, and then cooling and dehumidifying the air therewith. Here, the temperature linearity performance (tracking performance with respect to the setting temperature) may likewise be secured while in the dehumidifying heating mode by changing the temperature of the air blown from the onboard evaporator 6 through opening and closing of the on-off valve function.

In addition, while in the heating mode, given low outside air temperatures under conditions of frost formation on the vehicle-mounted external heat exchanger 10, the frost formation delaying mode is used to control the opening and closing of the on-off valve function of the first decompression unit 12 and the solenoid valve 18 of the second circuit 19 in alternation, such that a portion of the refrigerant passes through the first decompression unit 12 and circulates in the onboard evaporator 6. Thus, the amount of refrigerant circulating to the vehicle-mounted external heat exchanger 10 is decreased. As a result, stable heating operation may continue while delaying the formation of frost on the vehicle-mounted external heat exchanger 10 and the progression thereof, and constraining fluctuations in the temperature of blown air. Accordingly, the heating performance of the heat-pump-type vehicular air-conditioning system 1 may be enhanced.

The present invention is not limited to the invention of the above-described embodiments. Various modifications are also applicable, within a scope that does not exceed the substance of the invention. For example, in the above-described embodiments, the three-way switching valve 15 is used as a refrigerant switching unit. However, two solenoid valves or a four-way switching valve may also be used for switching.

REFERENCE SIGNS LIST

1 Heat-pump-type vehicular air-conditioning system
2 HVAC unit
3 Refrigerant circuit
6 Onboard evaporator
7 Onboard condenser
9 Electric compressor
10 Vehicle-mounted external heat exchanger
11 Receiver (Check valve-equipped receiver)
12 First decompression unit equipped with on-off valve
13A Discharge pipe (Discharge circuit)
13E Intake pipe (Intake circuit)
14 Cooling refrigerant circuit (Cooling cycle)
15 Three-way switching valve (Switching unit)
16 Second decompression unit equipped with on-off valve
16A Second decompression unit (Temperature-driven automatic expansion valve)
17 First circuit
18 Solenoid valve
19 Second circuit
20 Heating refrigerant circuit (heating cycle)
22, 23 Check valve
24 Check valve
37, 38 Refrigerant flow inlet
50 Solenoid valve-equipped temperature-driven automatic expansion valve
51 Solenoid valve
52 Temperature-driven automatic expansion valve

The invention claimed is:

1. A heat-pump-type vehicular air-conditioning system, comprising:
a cooling refrigerant circuit in which an electric compressor, a vehicle-mounted external heat exchanger, a receiver, a first decompression unit, and an onboard evaporator provided within an HVAC unit are connected in an above stated order;
an onboard condenser disposed on a downstream side of the onboard evaporator within the HVAC unit, including a refrigerant inlet connected to a discharge circuit of the electric compressor via a switching unit, and a refrigerant outlet connected to the receiver;
a first circuit including a second decompression unit connected between an outlet side of the receiver and one end side of the vehicle-mounted external heat exchanger; and
a second circuit including a solenoid valve connected between another end side of the vehicle-mounted external heat exchanger and an intake circuit of the electric compressor, the solenoid valve being open during heating,
a heating refrigerant circuit being configurable in such a manner that the electric compressor, the switching unit, the onboard condenser, the receiver, the first circuit including the second decompression unit, the vehicle-mounted external heat exchanger, and the second circuit including the solenoid valve are connected in an above stated order, and
in a heating mode, upon frost formation on the vehicle-mounted external heat exchanger, defrosting being enabled by switching the heating refrigerant circuit to the cooling refrigerant circuit and directly guiding a hot gas from the electric compressor to the vehicle-mounted external heat exchanger,
wherein the first decompression unit and the second decompression unit are each decompression units equipped with an on-off valve function, and the vehicle-mounted external heat exchanger and the onboard evaporator are jointly usable as evaporators while in the heating mode and while in a dehumidifying heating mode by using the on-off valve function of the first decompression unit and the second decompression unit, and
while in the dehumidifying heating mode, on-off control of the on-off valve function of the first decompression unit is performed in accordance with a temperature of one of air blown form the onboard evaporator and a fin thereof, so as to cause one of flow and obstruction of refrigerant to the onboard evaporator.

2. The heat-pump-type vehicular air-conditioning system according to claim 1, wherein the receiver is a check valve-equipped receiver including a check valve incorporated into a refrigerant flow inlet of a refrigerant circuit from each of the vehicle-mounted external heat exchanger connected to the receiver, and the onboard condenser.

3. The heat-pump-type vehicular air-conditioning system according to claim 1, wherein the first decompression unit and the second decompression unit are each one of a solenoid valve-equipped temperature-driven automatic expansion valve and an electronic expansion valve.

4. The heat-pump-type vehicular air-conditioning system according to claim 1, wherein the first decompression unit is a decompression unit equipped with an on-off valve function, the first circuit including the second decompression unit is provided with a check valve acting as an alternative unit of the on-off valve function and having tolerance only for refrigerant flow from the outlet side of the receiver to the vehicle-mounted external heat exchanger, and the vehicle-mounted external heat exchanger and the onboard evaporator are jointly usable as evaporators while in the heating mode and while in a dehumidifying heating mode by using the on-off valve function of the first decompression unit and the solenoid valve of the second circuit.

5. The heat-pump-type vehicular air-conditioning system according to claim 1, wherein while in the heating mode, the on-off control of the on-off valve function of the first decompression unit and on-off control of one of the on-off valve function of the second decompression unit and the solenoid valve of the second circuit are performed in alternation, in accordance with an outlet refrigerant temperature of the vehicle-mounted external heat exchanger and the temperature of one of the air blown from the onboard evaporator and the fin thereof, so as to cause one of flow and obstruction of the refrigerant to the vehicle-mounted external heat exchanger and the onboard evaporator, in alternation.

* * * * *